Figure 1:
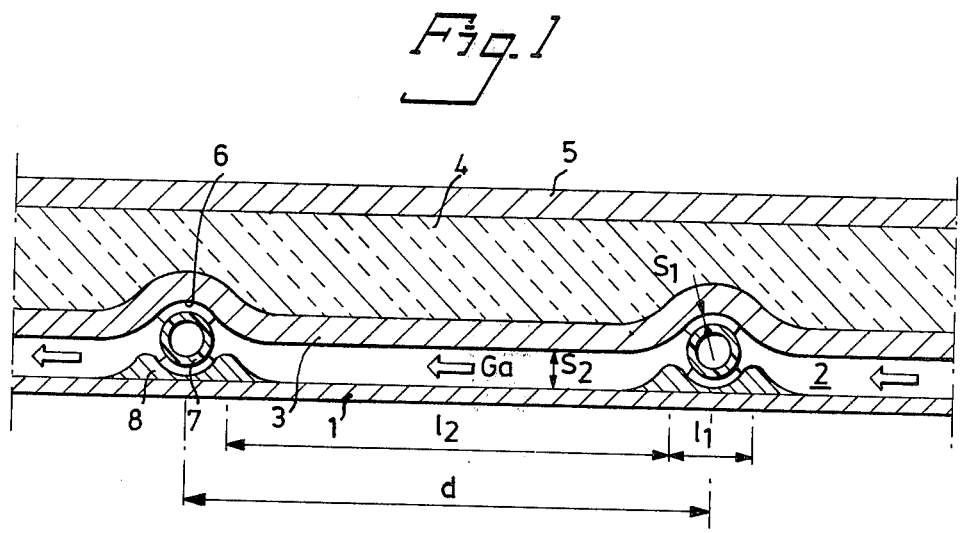

United States Patent [19]
Platell

[11] 4,186,795
[45] Feb. 5, 1980

[54] HEAT-EXCHANGER

[76] Inventor: Ove B. Platell, Tilskogsvagen 15, S-190 30 Sigtuna, Sweden

[21] Appl. No.: 856,631

[22] Filed: Dec. 2, 1977

[30] Foreign Application Priority Data

Dec. 6, 1976 [SE] Sweden ................... 7613694

[51] Int. Cl.² ............................................. F24D 5/10
[52] U.S. Cl. ................................... 165/53; 126/448
[58] Field of Search ................. 165/49, 53, 54, 55, 165/56; 126/271, 270

[56] References Cited

U.S. PATENT DOCUMENTS

| 2,462,557 | 2/1949 | Santee | 165/49 X |
| 3,043,567 | 7/1962 | Bergh | 165/56 |

FOREIGN PATENT DOCUMENTS

| 1107119 | 8/1955 | France | 165/53 |

*Primary Examiner*—Cohan Alan

*Attorney, Agent, or Firm*—Kinzer, Plyer, Dorn & McEachran

[57] ABSTRACT

An arrangement for exchanging heat between a system of pipes which conduct a fluid heat exchange medium and a platelike heat exchange member. The arrangement is particularly intended for use in connection with air temperature regulating means such as solar heaters and waste heat systems which operate at a small temperature differential between the temperature of the platelike heat exchange member and the fluid medium. Mutually facing surfaces of two substantially parallel material layers form a plenum. One of these surfaces comprises one side of the plate-like heat exchange member. The pipes which conduct the fluid medium are arranged parallel to one another in the plenum and are spaced apart from each other in a longitudinal direction of the plenum. A stream of gas or air is arranged to flow through the plenum. Gaps are formed on opposite sides of the pipes by spacer means. These gaps extend along a considerable part of the outer surface of each pipe and the gaps are dimensioned to cause the air or gas to move in a laminate flow through the gaps.

10 Claims, 5 Drawing Figures

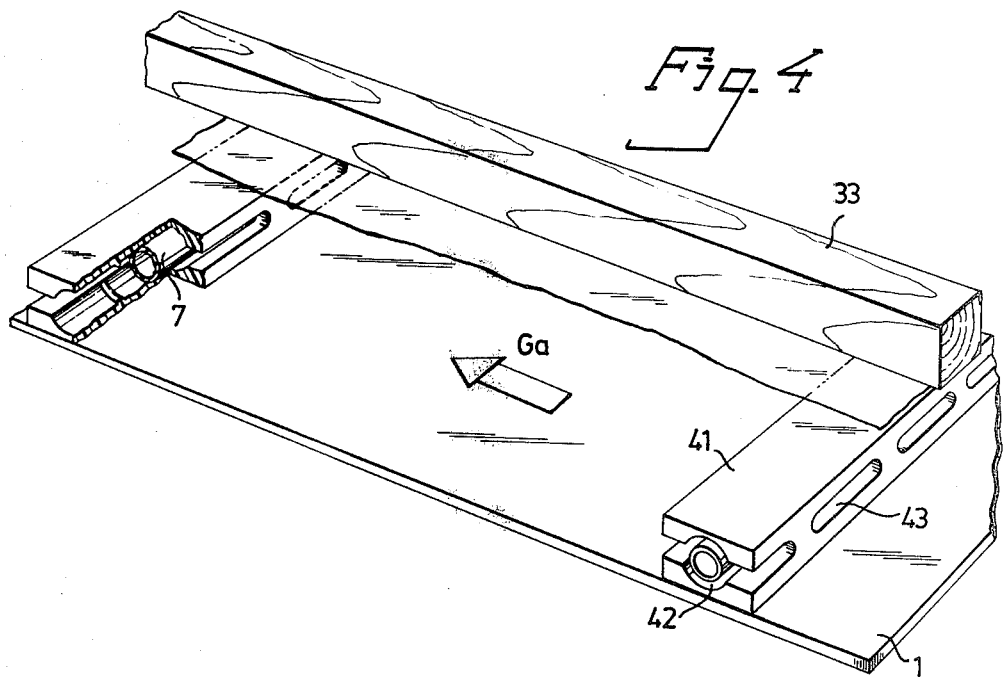
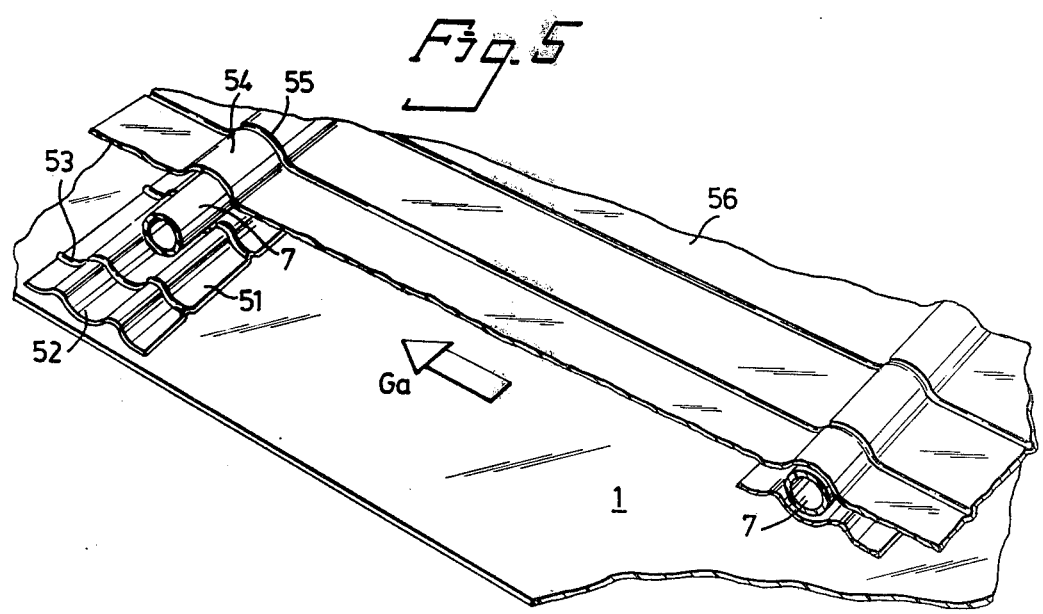

HEAT-EXCHANGER

The present invention relates to an arrangement for exchanging heat between a system of pipes adapted to conduct a flow of medium therethrough, and a plate-like, heat-emitting or heat-absorbing means surrounded by air or some other gaseous medium, said arrangement being intended particularly for use in connecttion with air-temperature regulating means and/or solar-heaters operating with a small temperature-differential between the temperatures of the plate-like member and the gaseous medium.

As is known, heat will leak from a heated room or space through surfaces defining said room or space and being in contact with colder surroundings. Heat will also be lost through ventilation, which losses are compensated by supplying heated air to said room or space. Normally, those inwardly facing surfaces through which heat is liable to leak are thermally insulated. If these surfaces are heated directly and this heat is supplied by means of a heat-carrying medium, such as water, the room or space will obtain the same temperature as the surfaces heated. If this medium is in direct thermal contact with the whole of said surface, the temperature of the medium may be the same as the desired room temperature. There is then obtained a so-called strict low-temperature heat-emitting system, hereinafter called low-temperature system or LTHE-system.

In practice, it is not possible to provide a low-temperature heat-emitting system for all surfaces through which heat is liable to leak, such surfaces being referred to hereinafter as heat-leaking surfaces. Ceilings, certain walls and floors can be provided with such a system, while, for practical reasons, windows in particular cannot be provided with such a system. It has been found, however, that the heat which leaks through surfaces not provided with low-temperature heat-emitting system can be compensated for by heating those surfaces provided with such a system to a higher temperature than would otherwise be the case.

This, however, requires these surfaces to be influenced by the heat-leaking surfaces, since the effective heat transfer is effected by radiation. The additional temperature required is small, i.e. of the order of magnitude of some degrees.

The dominating heat requirement of certain rooms or spaces is in the floor (cellars having a heated space thereabove). In these cases the low-temperature heat-emitting surface is the floor. Generally the best surface in this respect is the ceiling and/or possibly the outer walls.

Hitherto, no temperature-regulating system has been fully developed in which a low-temperature medium can function as a heat source. Attempts have been made to construct extra large water-radiators, in order that sufficient heat can be obtained with a cooler radiator-water. It has been found that the radiator surfaces must be unreasonably large if sufficient heat-emission is to be obtained with a water temperature of 25°–30° C.

Another room-heating method is one in which coils for carrying hot water are embodied in or placed in the floor. The temperature of the floor must be maintained at such a high magnitude, however, that the heat radiated therefrom compensates for the transmission of heat through the ceiling and through the external walls. The emission of heat from the floor is impeded by carpets and furniture, which means that the temperature of the floor must be much higher than is the case when the heat-emitting means is placed in the ceiling.

The method which best enables the use of a low-temperature medium is that method in which a room, for example, is heated from the ceiling. In this method there is used a system of flanged pipes incorporated in the space above a ceiling. The efficiency of the flanges in present day ceiling-heating systems in which heat is carried by water is very poor. Furthermore, the flanges are not sufficient to cover the whole of the ceiling. As a result, such heating systems are not strict low-temperature systems. Furthermore, since such systems require the use of copper and aluminium they are expensive systems, this is particularly the case when practically the whole of the ceiling area shall be covered with flanges in order to provide a more pronounced low-temperature system.

When buildings, premises or rooms are heated by solar energy, it is desirable, for reasons of cost, to use planar solar-heaters (non-focussing). The efficiency of such a solar-heater is better the lower the temperature the heat-absorbing medium can have. Conventional heating requires, however, a mean temperature of 50°–70° C., which impairs the efficiency of a solar-heater. Thus, also from this point of view, there is a need of a heating technique which can be used efficiently with a medium of low temperature both in buildings, rooms etc. and in solar-heaters.

The storage of thermal energy by heating a material can be effected in accordance with two main methods. The first method utilizes a high temperature swing in a relatively small volume. A certain given volume obtains greater storage capacity the further the temperature of the body can be reduced when heat is taken therefrom to heat a space, room etc. Thus, there is also here need of a low-temperature system. The other method utilizes a small temperature swing in a relatively large volume. In the case of large volumes, there are obtained large defining surfaces with heat leakage. The lower the temperature which can be accepted of the volume, the smaller the heat lost through leakage. Thus, a low-temperature technique is desirable when heating rooms, buildings etc. with heat obtained from a heat-store such as that described in U.S. patent application Ser. No. 866,719, filed Jan. 3, 1978, which is a continuation in part of my previously filed application, Ser. No. 841,818, filed Oct. 13, 1977 and now abandoned.

Large quantities of energy are generated today in the form of waste heat. The temperature, however, is often so low that the energy cannot be used for, e.g., the heating of buildings using conventional techniques. In this instance, it is desirable to apply a low-temperature technique which could enable large quantities of heat to be recovered. With such a technique, it is also possible to render remote-heat systems more effective.

A number of buildings or premises are now heated by means of a heat pump. The heat is obtained from the ambient air and the pump delivers the heat at a very high temperature. The heating factor varies between approximately one and three. If there was available a heating system which was effective at temperatures between 25°–30° C., such a heat pump could work with a much higher heat factor. Alternatively, with a heat pump one can manage in very cold weather without adding heat. The need of a low-temperature system is thus, even in this case, very high.

An object of the invention is to provide an arrangement of the type mentioned in introduction which fulfils the aforementioned requirements and which is not encumbered with the aforementioned disadvantages.

Such an arrangement has been provided in accordance with the invention by the fact that the pipes of the pipe-system are placed parallel with one another and lie substantially freely in a gap or plenum between the mutually facing surfaces of two substantially parallel material layers, of which surfaces the one comprises one side of the plate-like member; and by the fact that a stream of gas or air is arranged to flow through said gap at right angles to the pipes. In this way, the temperature of the gas or air stream passing through the gap will increase in the vicinity of the tubes and decrease in the areas between the sequentially arranged tubes. The gas or air stream, during and subsequent to passing a tube, will act as a heating flange connected to the tube (or a cooling flange, since the system can also be used to reduce the temperature of a room or space). The heat transfer between tubes and gas or air-stream is particularly good when the surfaces defining the gap are each provided with an arcuately curved portion having a greater radius of curvature than the tube along each tube which is centered in the two arcuately curved portions by means of spacers located in the part gaps between the two arcuately curved portions and the pipe. The arcuately curved portions of at least one surface are suitably formed integral with the material of said surface. Alternatively, the arcuately curved portions of at least one surface may have the form of strips, for example thin-wall profile strips made of plastics or metal, firmly fixed onto said surface.

In order to simplify the installation of the arrangement, the pipes and associated pairs of arcuately curved portions are securely joined together by means of distance pieces.

When the plate-like member comprises a ceiling panel of a room and/or a panel of an outer wall, the gaseous medium flowing into the gap may suitably comprise ventilation air passed to said room. It should be observed, however, that the change in temperature of the ventilation air thus obtained is only of secondary significance. The primary purpose of the air flowing in the gap is to transfer heat from the pipes to the ceiling or the ceiling panel.

When the plate-like member comprises a heat-absorbing plate arranged on the front side of a solar-heater, the gaseous medium flowing in the gap is conveniently gas or air circulating in a closed circuit within the solar-heater, said circuit containing a return-passage for the flowing gaseous medium or the flow of air arranged in the rear part of the solar-heater.

It is of great economic significance that the plate-like, heat-emitting or absorbing member may comprise a non-metallic material, such as wood, plastics, gipsum or fiber plates or the like. The tubes may also comprise an inexpensive plastics material.

Figure 2:
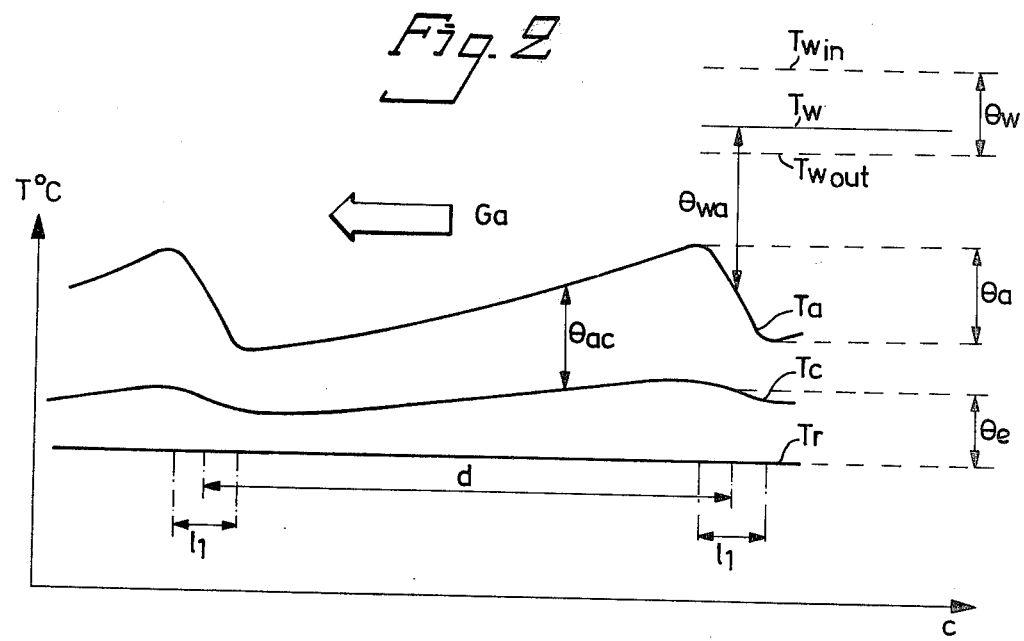
Figure 3:
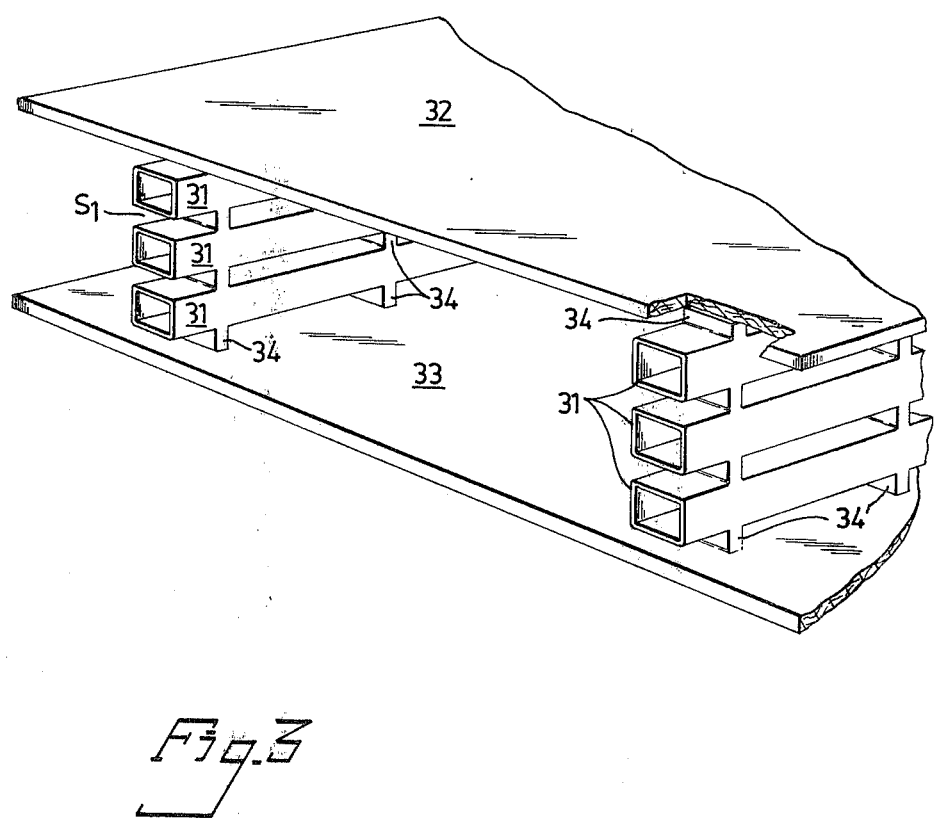

In order for the invention to be more readily understood and further features thereof made apparent, exemplary embodiments of the invention will now be described with reference to the accompanying schematic drawings, in which FIG. 1 is a cross-sectional view of an arrangement according to the invention, FIG. 2 illustrates variations in temperature at different locations along the arrangement shown in FIG. 1, FIG. 3 is a partial view of an embodiment according to the invention when applied to a wooden ceiling, FIG. 4 is a perspective view of an embodiment with strips which are common to the two surfaces and FIG. 5 is a perspective view illustrating a further embodiment comprising particularly light units.

The arrangement illustrated schematically in FIG. 1 comprises a ceiling panel 1, an air gap 2, a diffusion-tight material layer 3, an insulating layer 4 and a roof 5. The layer 3 has arranged therein grooves 6 which accomodates plastics pipes 7 which are arranged in said grooves so as to leave a space S1 between the pipes and the walls of respective grooves 6 in the layer 3 and the walls of respective grooves 8 formed in the upper side of the roofing panel 1. The thickness or depth of the gap 2 is referenced S2. The pipes 7 conduct water at a temperature of, for example, 25°–30° C., and air is caused to flow through the gap 2 in a direction shown by the arrow G1.

The variations in temperature of the air flowing in the gap shown in FIG. 1 are illustrated in FIG. 2. When the air passes a pipe 7, which may have a temperature of approximately 25° C., the air is heated, whereafter during its passage to the next pipe 7 the temperature of the air falls approximately 2° C., the temperature of the air being again increased at said next pipe. This is illustrated by the curve Ta in FIG. 2. The variations in temperature of the ceiling panel are illustrated by the curve Tc in FIG. 2, which exceeds the room temperature Tr by, for example, 2.5°–3° C. when the dimensions of the low-temperature heating system are satisfactory.

In the embodiment illustrated in FIG. 3 each pipe 7, shown in FIG. 1, in principle divided in a group consisting of three pipes 31, arranged in a vertical plane. The pipes 31 are mutually connected and connected to a roof panel 32 and a ceiling panel 33 by means of spacers 34, which are dimensioned such that the air gaps S1 between the pipes and between the outermost pipes and the panels are obtained. In the embodiment shown the pipes 31 have a rectangular cross-section and may suitably be manufactured from a plastics material to form a unitary element with the spacers 34, the panel 33 and possibly also with the panel 32. Alternatively, the panels 32,33 may consist of wooden chip boards or the like.

In the embodiment illustrated in FIG. 4, the strips 31,32 are replaced by plastics profile strips 41 having axially extending holes 42 for attaching the pipes 7 and transversly extending, wide channels 43 which also extend around the pipes 7 to form the part gaps illustrated in FIG. 1 having the width or depth S1. The strips 41 are mounted on rafters 33 and the ceiling panel 1 may, in this embodiment, comprise thin sheets of, for example, plaster board attached to the undersurfaces of the strips 41.

FIG. 5 illustrates a modified embodiment, comprising a ceiling 1, made, for example, of a thin plastics layer which is bonded to the undersurfaces of mutually parallel plastics profile strips 51 by means of an adhesive, said strips being provided with a respective groove 52 for accommodating a plastics pipe 7. The strips 51 are reinforced by means of upwardly extending and transversely extending embossments 53 or ridges, the height of which is sufficient for the embossments or ridges to also serve as distance means for the pipes 7, said pipes being bonded to the embossments 53 by means of an adhesive. Corresponding grooves 54 and downwardly extending embossments or ridges 55 are arranged in a thin sheet 56 of plastics material attached to rafters (not shown) and to which embossments the pipes 7 are bonded by means of an adhesive. This embodiment affords a particularly light and inexpensive construction.

The theoretical background to the application of the invention will be apparent from the following, in which the following designations are used.

LTHE=equals low-temperature heat-emitting system according to the invention
$G_W$=water flow (kg/s)
$G_a$=air flow (kg/s)
$Q_{tot}$=total heat-emitting effect from the pipes (W)
$Q_{out}$=heat-emitting effect directly out to the surroundings (W)
$Q_{in}$=heat-emitting effect into the heated space or room (W)
$q_{tot}=Q_{tot}/A$ (W/m$^2$)
$q_{out}=Q_{out}/A$ (W/m$^2$)
$q_{in}=Q_{in}/A$ (W/m$^2$)
$T_{w(out/in)}$, Ta, Tc, Tr=Temperature curves for water (outgoing, incoming), air, ceiling (or roof) and room shown in FIG. 2 (°C.)
$\theta$=temperature differences defined in FIG. 2 (°C.)
$A=b\cdot c=$LTHE-surface (m$^2$)
$S_1$=gap width for the air in the vincinity of the pipes (FIG. 1) (m)
$S_2$=gap width for the air across the LTHE-surface (FIG. 1) (m)
b=the width of the LTHE-surface (m)
c=the length of the LTHE-surface (m)
d=the division between the pipes on the LTHE-surface (FIG. 1) (m)
$\zeta_1$=the depth of the gap for the air in the vicinity of the pipes (FIG. 1) (m)
$\zeta_2$=the depth of the gap for the air across the LTHE-surface (FIG. 1) (m)
$\alpha_1$=the heat-transmission number between air and pipes (W/m$^2$°C.)
$\alpha_2$=the heat transmission number between air and LTHE-surface (W/m$^2$°C.)
$\rho_a$=the air density=1.29 kg/m$^3$
$\eta_a$=the dynamic viscosity of air=18.10$^{-6}$ Ns/m$^2$
$\lambda_a$=the thermal conductivity number for air=0.025 W/m°C.
$\Delta_{ptot}$=the total pressure drop for air during its passage through LTHE (N/m$^2$)
$N_{netto}$=the required power to obtain the airflow $G_1$ (W)
$c_{pw}$=the specific heat of water
$c_{pa}$=the specific heat of air A LTHE-surface looses directly "outwardly" to the surroundings the heat-power $Q_{out}$ and emits, through radiation, the heat-power $Q_{in}$ "inwardly" into the room.

The following relationship applies to the total heat requirement $Q_{tot}$ to the room:

$$Q_{tot}=Q_{in}+Q_{out}=G_w\times c_{pw}-\theta_w=q_{tot}\times c_{pw}\times \theta_w \quad (1)$$

Depending upon the extent to which it has been possible to cover the total requirement $Q_{tot}$ with LTHE, there remain different requirements of $Q_{in}$ which shall be covered by the excess temperature $\theta_e$, which is:

$$Q_e = \frac{Q_{in}}{\alpha_{rad}\times A} \quad (2)$$

at normal room temperature and practically all occurring surfaces $\alpha_{rad}=5.5$ W/m$^2$.°C.

In the case of a well-insulated room in which LTHE has been effected satisfactorily, $Q_{in}$ is approximately equal to 150 W and A=10 m$^2$, whereupon:

$$Q_e = \frac{150}{5.5 \times 10} = 2.7° C.$$

The heat-power which shall be passed to the air at one pipe is:

$$q_{tot}\times b\times d=G_a\times c_{pa}\times \theta_a \quad (3)$$

whereupon there is obtained:

$$G_a = \frac{q_{tot}\times b\times d}{c_{pa}\times \theta_a} \quad (4)$$

The heat-absorbing capacity flow $G_a\times c_{pa}\times \rho_a$ shall be in balance with the heat-transmitting surface $2\times \zeta_1\times b$ in the two gaps multiplied by the heat-transfer number $\alpha_1$ of the surfaces.

The air thus takes up the heat-flow:

$$G_a\times c_{pa}\times \theta_a=2\times \zeta_1\times b\times \alpha_1\theta_{wa} \quad (5)$$

The air delivers the heat flow:

$$\zeta_2\times b(q_{out}+q_{in})=\zeta_2\times b(q_{out}+\alpha_2\times \theta_{ac}) \quad (6)$$

The heat taken up by the air and the heat delivered by the air are equal, i.e. (5)=(6). The gap dimensions are selected so that a laminar flow prevails, whereupon for each gap (sequence i):

$$\alpha_i = \frac{Nu \times \alpha_a}{2\, s_i}, \text{ where } Nu = 7.5 \quad (7)$$

The pressure drop, which is of the laminar type, is determined practically completely by the conditions in gap $s_1$ (in the vicinity of the pipes). In this respect, the following relationships prevail $$\Delta_{ptot} = \frac{12 \times \eta_a \times \zeta_1 \times c \times G_a}{d \times b \times \rho_a \times 2 \times s_1^3} \quad (8)$$

and when $\eta_a=18\times 10^{-6}$ Ns/m$^2$ and $\rho_a=1.29$ kg/m$^3$, then $$\Delta_{ptot} = \frac{83.7 \times \zeta_1 \times c \times G_a}{10^6 \times d \times b \times s_1^3} \quad (9)$$

from this it follows that the theoretical power requirement for producing airflow $G_a$ is:

$$N_{netto} = \Delta_{ptot} \times \frac{G_a}{\rho_a} \quad (10)$$

Example:
A room having
$q_{tot}=40$ W/m$^2$
A=10 m$^2$
$\theta_a=2°$ C.
$\theta_{wa}=2°$ C.
b=3 m
c=3 m
d=0.3 m
$s_1=1$ mm from equation 4 we obtain $$G_a = \frac{40 \times 3 \times 0.3}{1000 \times 2} = 0.018 \text{ kg/}s \; (\approx 50 \text{ m}^3/h =$$

normal ventilation flow in a bedroom)

From equation 7 we obtain $$\alpha = \frac{7.5 \times 0.025}{2 \times 0.001} = 94 \; W/m^2 \times {}^\circ C.$$

and from equation 5 and 3 we obtain $$\zeta_1 = \frac{40 \times 0.3}{2 \times 2 \times 94} = 0.032 \text{ m } (= 32 \text{ mm})$$

Equation 9 gives $$\Delta_{ptot} = \frac{83.7 \times 0.032 \times 3 \times 0.018}{10^6 \times 0.3 \times 3 \times 10^{-9}} = 160 \; N/m^2$$

Finally from equation 10 we obtain:

$$N_{netto} = 160 \times \frac{0.018}{1.29} = 2.2 \; W$$

= 2.2 Watt, of no significance.

The following advantages can be recited by way of summary:
1. Low-temperature waste heat can be used directly.
2. The remote heating system has a high capacity and small leakage losses.
3. The heat buffer can store low-temperature heat which enables (a) a waste heat to be stored. (b) solar-heaters to operate with a high degree of efficiency, (c) minimum leakage losses.
4. The heat buffer (with limited volume) can be used down to low temperatures.
5. A heat pump can operate at very high heating factors.
6. A LTHE-system incorporated in a ceiling has but small thermal inertia-is highly controllable.
7. No problems concerning condensation when cooling (equally so when keeping a room or space cool, which hitherto has only been achieved with so-called air-conditioning).
8. An extremely comfortable temperature environment without drafts-no surfaces heated to temperatures which differ greatly from the room temperature.

The LTHE-system can be used as a heat-emitting system in rooms, buildings etc. in which the aforementioned advantages can be had. The system is of particular interest, since it offers an inexpensive construction for ceilings and outer walls.

The heated ceiling and walls all have very low thermal inertia, which enables the room temperature to be quickly regulated and therewith the radiation environment. LTHE-systems in floors (where heat lost from the room or space is mainly through the floor) can be constructed in principally the same manner as the ceiling/wall construction.

The LTHE-system can also be used to keep premises cool during the summer temperature without the requiring a high lower temperature. This means that the surface temperature of the pipes can lie above the dew point of the air in said premises without risk of condensation or subsequent damage to the construction due to moisture.

The LTHE-system is inexpensive to construct, and affords good heat transfer from/to a pipe to/from a surface. For example, the materials formning part of the construction do not need to be highly thermally conductive. Thus, the flanges need not be made from, for example, copper or aluminium in order to increase their efficiency.

If the LTHE-system is seen as an effective manner of transferring heat between a surface and a pipe, it would constitute a promising principle on which to construct very inexpensive solar heaters. In this way an extremely simple solar-heater made of masonite/plastics foil and plastics pipes can be constructed, without the need of glasing.

I claim:
1. An arrangement for exchanging heat between a system of pipes adapted to conduct a flow of medium therethrough, and a plate-like heat exchange means, said arrangement being intended particularly for use in connection with air-temperature regulating means operating at a small temperature differential between the temperature of the plate-like heat exchange means and the medium, said arrangement including mutually facing surfaces of two substantially parallel material layers, one of which surface comprises one side of the plate-like heat exchange means, defining an elongated plenum, respective pipes of said system being arranged in said plenum to extend parallel with one another and at a distance from each other in a longitudinal direction of said plenum; and a stream of gas or air arranged to flow through the plenum, characterized in that gaps having a constant width are formed on opposite sides of the pipes by spacer means, which gaps extend along a considerable part of the outer surfaces of each pipe with the gaps having dimensions to cause the air or gas to move in a laminar flow through said gaps.

2. An arrangement according to claim 1, characterised in that the surfaces defining the gap are each provided with an arcuately curved portion whose radius of curvature is greater than that of the pipe along each pipe which is centered in the two arcuately curved portions by means of distance means arranged in the part-gaps between the two arcuately curved portions and the pipe.

3. An arrangement according to claim 2, characterised in that the arcuately curved portions of at least one surface is formed integrally with the material layer of said surface.

4. An arrangement according to claim 2, characterised in that the arcuately curved portions of at least one surface has the form of separate strips, for example thin-walled plastics or metal-profile strips, which are firmly mounted on said surface.

5. An arrangement according to claim 2, characterised in that the pipes and the associated pairs of arcuately curved portions are firmly joined together by means of distance means.

6. An arrangement according to claim 1, in which the plate-like means is a ceiling panel of a room, characterised in that the gaseous medium flowing through the gap is ventilation air passed to said room.

7. An arrangement according to claim 1, in which the plate-like means is a heat-absorbing plate on the front side of a solar-heater, characterised in that the gaseous medium flowing in said gap comprises gas or air circulating in a close circuit within the solar-heater, said circuit comprising a return passage for the flowing gaseous medium arranged in the rear part of the solar-heater.

8. An arrangement according to claim 1, characterised in that the plate-like heat exchange means comprises a non-metallic material, such as wood, plastics, plaster or fibre boards etc.

9. An arrangement according to claim 1, characterised in that the pipes of said system of pipes are plastics pipes.

10. The arrangement of claim 1 in which said pipes are cylindrical and the gaps extend for a considerable portion of both semi-circumferences of the pipes.

* * * * *